G. E. STEVENSON.
MULTIPLE SHAPER.
APPLICATION FILED JULY 3, 1917.
1,335,864.
Patented Apr. 6, 1920.
8 SHEETS—SHEET 1.
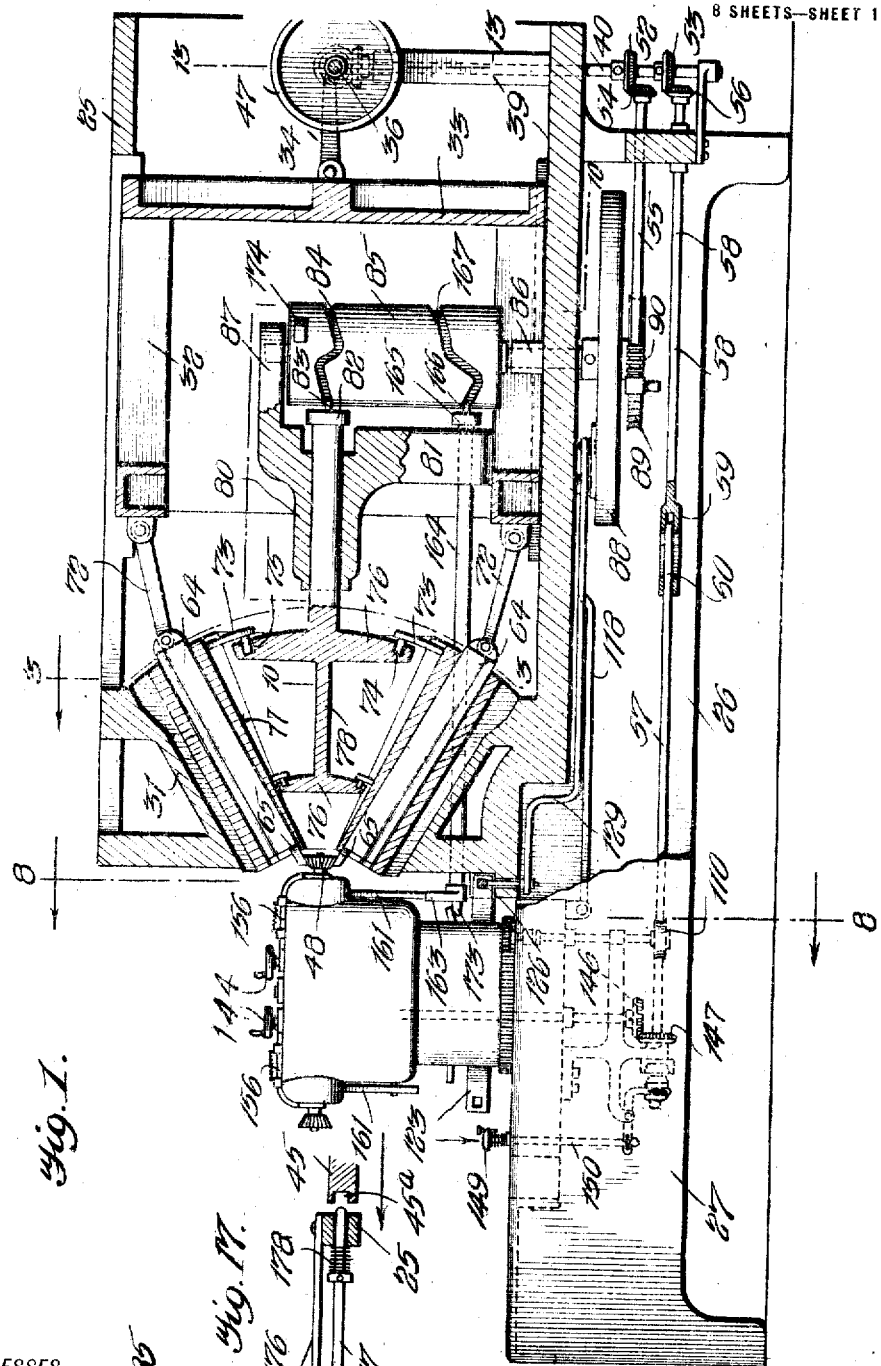
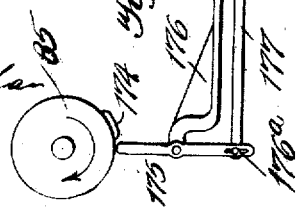
WITNESSES
INVENTOR
GEORGE E. STEVENSON
BY
ATTORNEYS

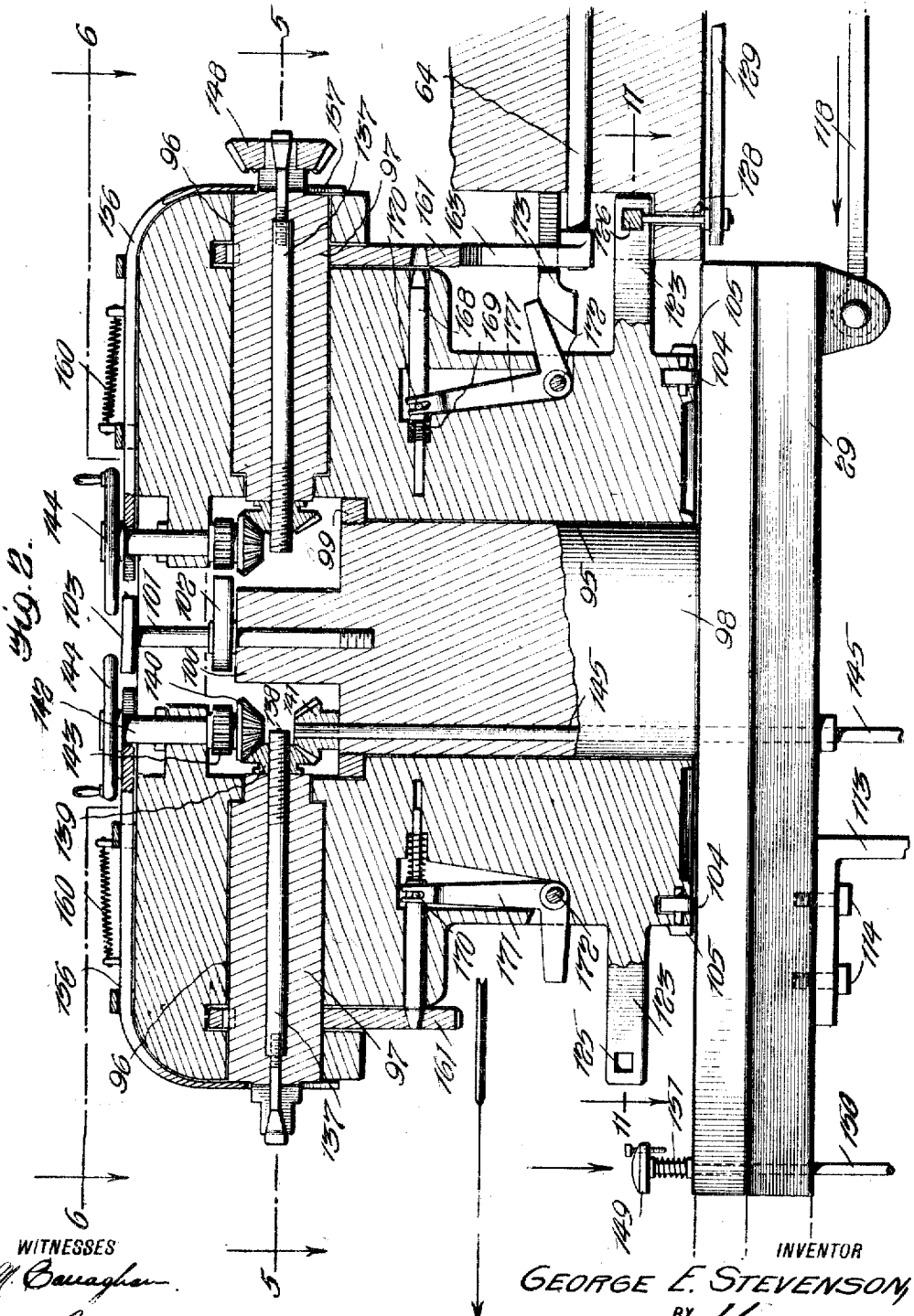

George E. Stevenson, Inventor

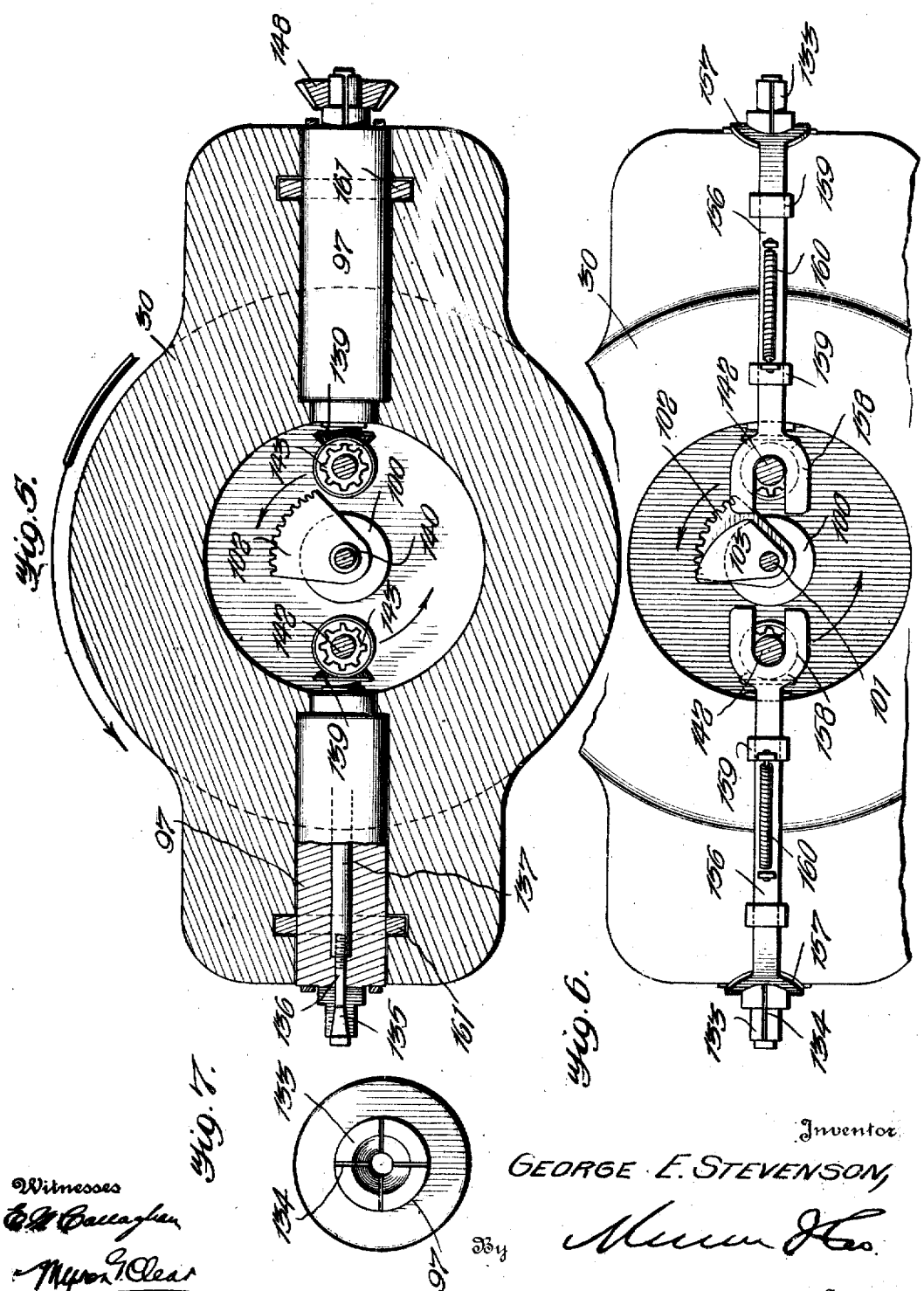

G. E. STEVENSON.
MULTIPLE SHAPER.
APPLICATION FILED JULY 3, 1917.
1,335,864.
Patented Apr. 6, 1920.
8 SHEETS—SHEET 5.
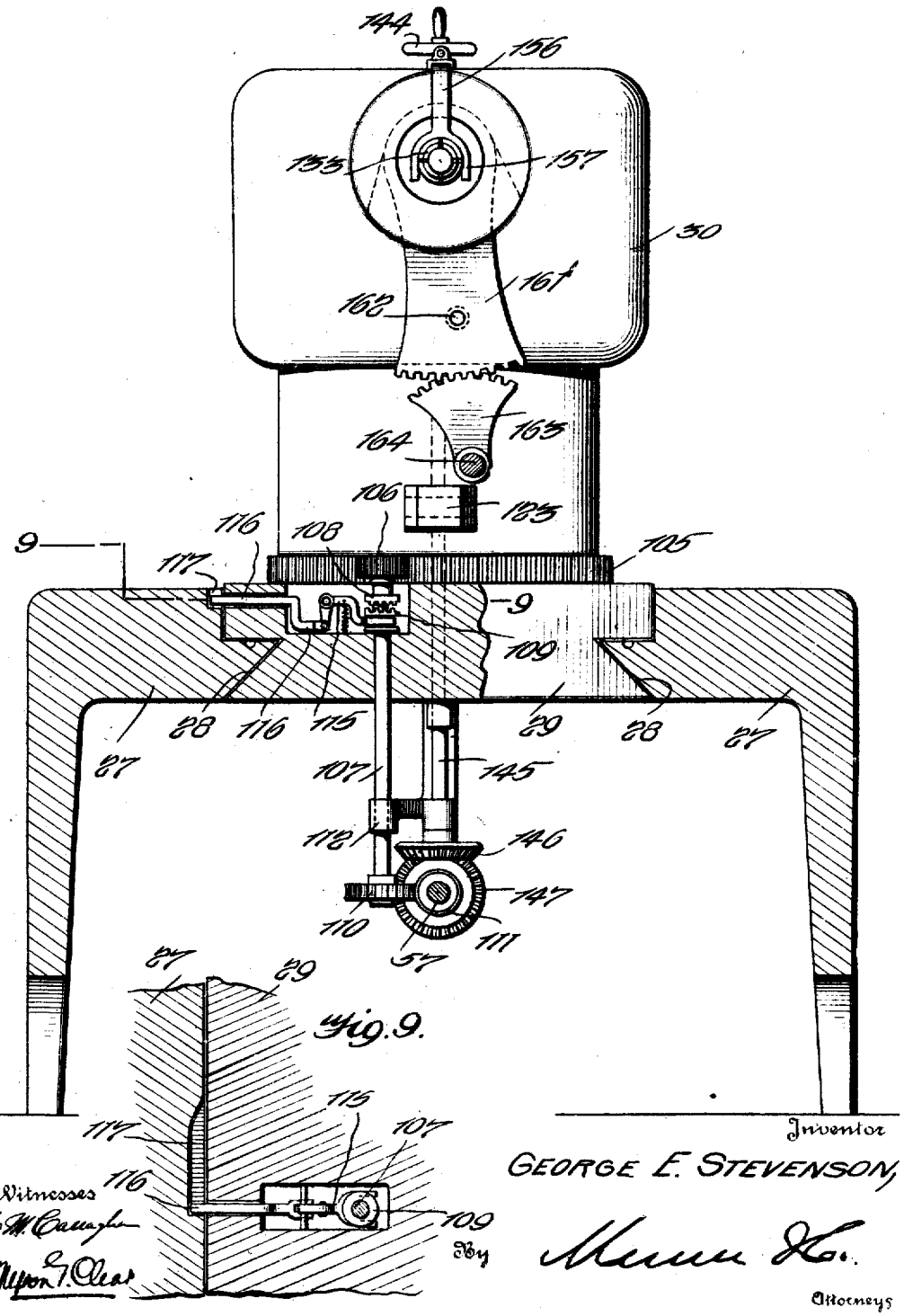
Witnesses
E. M. Cauaghen
Nelson T. Clear
Inventor
GEORGE E. STEVENSON,
By
Munn & Co.
Attorneys

G. E. STEVENSON.
MULTIPLE SHAPER.
APPLICATION FILED JULY 3, 1917.

1,335,864.

Patented Apr. 6, 1920.
8 SHEETS—SHEET 6.

George E. Stevenson, Inventor

Witnesses

By

Attorneys

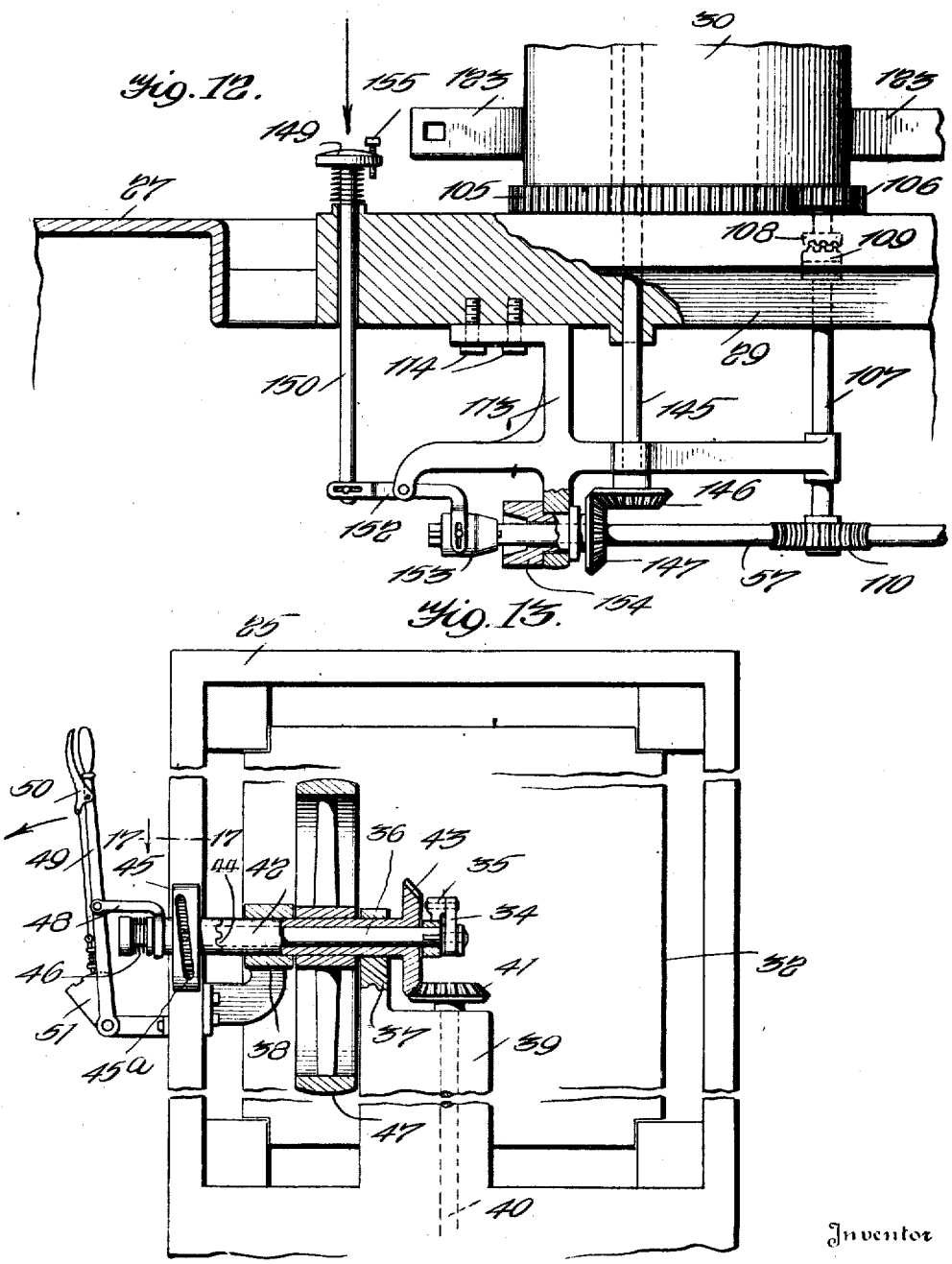

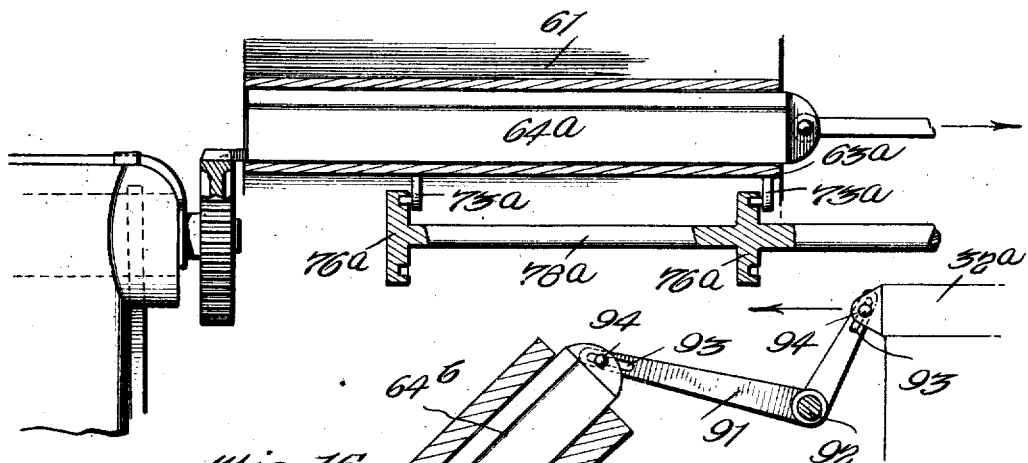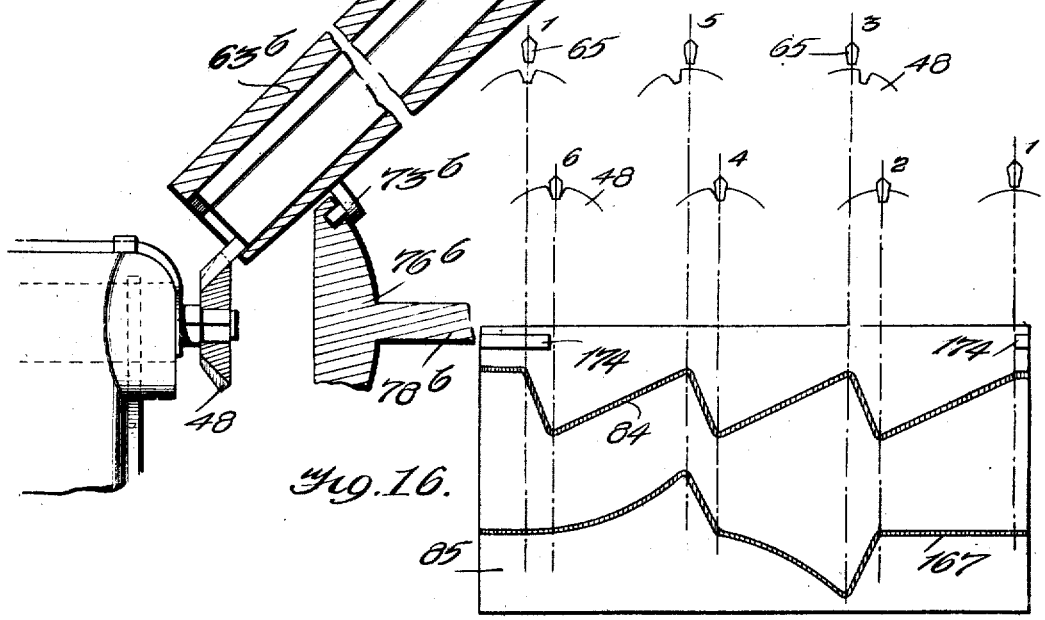

UNITED STATES PATENT OFFICE.

GEORGE EMETT STEVENSON, OF INDIANAPOLIS, INDIANA, ASSIGNOR, BY DIRECT AND MESNE ASSIGNMENTS, TO STEVENSON GEAR AND MANUFACTURING COMPANY, OF INDIANAPOLIS, INDIANA, A CORPORATION OF INDIANA.

MULTIPLE SHAPER.

1,335,864.    Specification of Letters Patent.    Patented Apr. 6, 1920.

Application filed July 3, 1917. Serial No. 178,335.

*To all whom it may concern:*

Be it known that I, GEORGE EMETT STEVENSON, a citizen of the United States, and a resident of Indianapolis, in the county of Marion and State of Indiana, have invented an Improvement in Multiple Shapers, of which the following is a specification.

My present invention relates generally to multiple shapers, and more particularly to machines for cutting all of the teeth of a gear, sprocket and the like at one operation, instead of cutting the same tooth by tooth as is now required, my primary object being the provision of a practical and efficient machine whereby this multiple operation may be carried out and wherein the parts are capable of ready adjustment to cut bevel gears, spur gears, skew gears, sprockets and other machine elements of this nature.

Generally speaking my invention proposes a machine which may be broadly divided into three parts, first a multiple armed power head whereby simultaneous and uniform application of power may be made to a plurality of cutters for cutting the gear or sprocket slots; second a directing body form in which the cutters and their supports are movable and adjustable in operation under the influence of the power head and certain mechanism controlling and adjusting the cutters during the action, and third a semi-automatic turret arbor, the movements of which, entering directly into the formation of the gear or sprocket, are automatically controlled, and the multiplicity of arbors of which provides for the manual application of a gear or sprocket blank to one or more arbors thereof while another arbor with its blank is in the operating position for the action of the power head driven and directing body form controlled cutters.

Other objects of my invention, its novel points and advantages will more particularly appear from the following description, in which reference is made to the accompanying drawings, forming a part of this application, and wherein—

Figure 1 is a view partly in side elevation and partly in vertical longitudinal section of substantially the complete machine.

Fig. 2 is a vertical longitudinal section through the turret arbor, considering the latter as in the operative position.

Fig. 3 is a vertical transverse section taken substantially on the line 3—3 of Fig. 1 looking at the rear of the directing body form.

Figure 5:
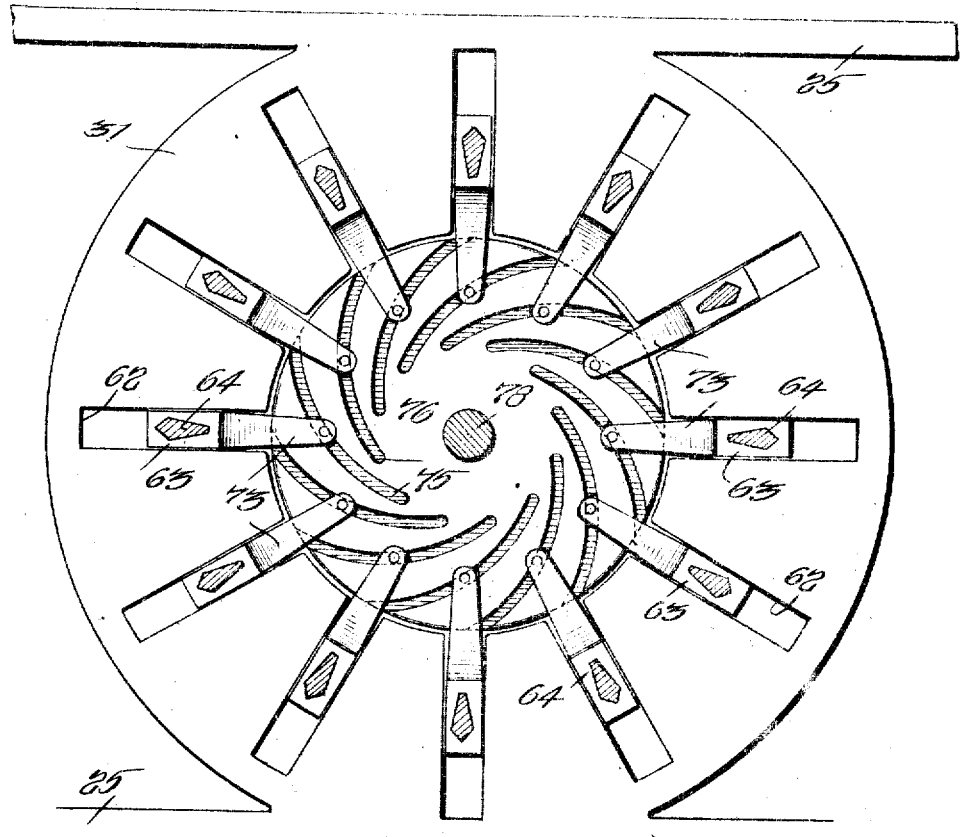

Figs. 5 and 6 are horizontal sectional views through the turret arbor taken respectively on lines 5—5 and 6—6 of Fig. 2.

Fig. 7 is an elevation of the outer end of one of the arbors removed.

Fig. 8 is a vertical cross section through the machine taken substantially on the line 8—8 of Fig. 1.

Fig. 9 is a detail horizontal section taken substantially on the line 9—9 of Fig. 8.

Figure 10:
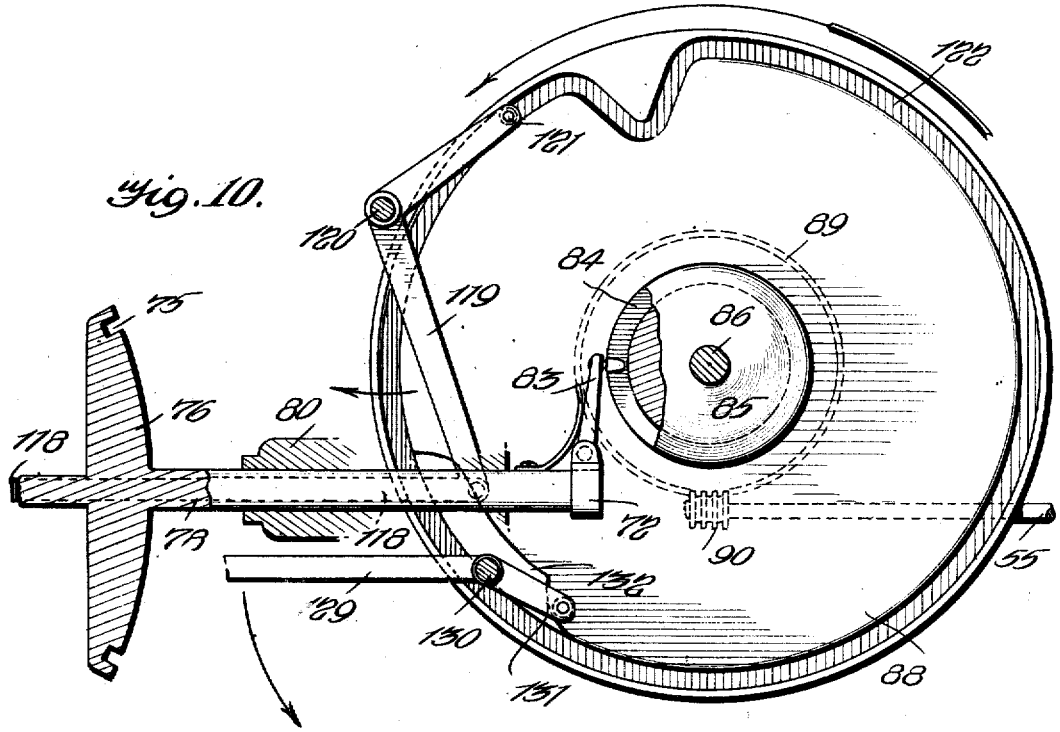
Figure 11:
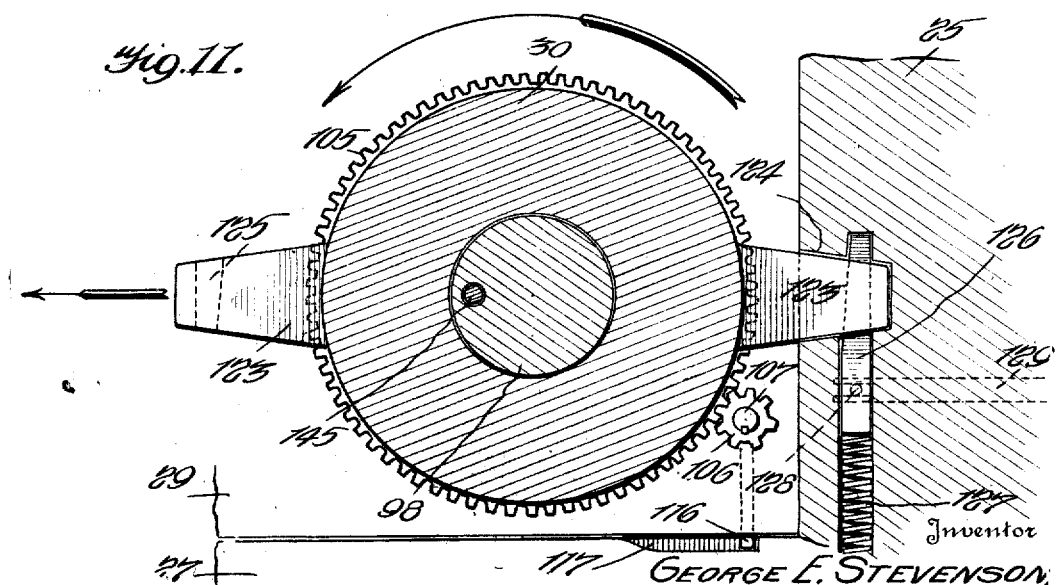

Fig. 10 is an enlarged horizontal section taken substantially on the line 10—10 of Fig. 1;

Fig. 11 is a similar view taken substantially on the line 11—11 of Fig. 2;

Fig. 12 is an enlarged view partly in elevation and partly in section of the lower portion of the turret arbor and adjacent parts of the frame and driving mechanism thereof;

Fig. 13 is an enlarged vertical transverse section taken substantially on line 13—13 of Fig. 1;

Fig. 14 is a view partly in elevation and partly in section of portions of the turret arbor and directing body form, illustrating a slightly modified construction;

Fig. 15 is a similar view illustrating another slightly modified form,

Fig. 16 is a diagram illustrating the relative positions of the gear blank and one of the cutters, during the several stages of operation, and Fig. 17 is a detail horizontal section taken substantially on line 17—17 of Fig. 13.

Referring now to these figures, the frame 25 of my improved machine, which is generally rectangular in cross section, with its longitudinal axis disposed horizontally, has lower depending side portions 26 which serve to support the major portion of the frame in elevated position and which have forward side extensions 27 projecting forwardly beyond the forward end of the rectangular portion of the frame. The forward side extensions 27 of the frame just mentioned, as best seen in Fig. 8, have inner angular and beveled longitudinal edges 28 forming guides for the bed plate or platform 29 of the turret 30, the latter of which in operation has forwardly and rearwardly sliding movements in addition to rotation, as will be presently described, the sliding movements taking place at the forward end of the rectangular portion of the main frame 25. At the same end the frame 25 supports the directing body form 31.

In the rear portion of the main frame 25 a reciprocating head 32 is longitudinally slidable, this head being of hollow rectangular form, as plainly seen by a comparison of Figs. 1 and 13, with a solid rear plate 33 from a central point of the latter of which a pitman 34 projects rearwardly to the crank 35 of a shaft 36, the latter being transversely mounted in bearings 37 and 38 carried by the frame 25 rearwardly of the head 32. The bearing 37, as seen particularly in Fig. 13, is formed at the upper portion of an upright 39, forming a part of the frame 25 and through which upright is journaled a vertical shaft 40, having at its upper end, below the inner end of the shaft 36, a bevel gear 41.

Rotatably disposed upon the shaft 36 is a sleeve 42 having at its inner end a bevel gear 43 in mesh with the gear 41, and having at its outer end a clutch face 44 for engagement by a clutch member 45 splined on the outer portion of the shaft 36 and having an inclined slot 45ª and normally held in engaged position with the sleeve by means of a spring 46 to thus connect the sleeve with the shaft. To the sleeve 42 is secured a driven pulley 47 connected by a belt or other suitable power connection to a suitable source of power, so that with the clutch member 45 in engaged position movement is transmitted to the head 32 through the crank and pitman connection of the shaft therewith and to the upright shaft 40, through the bevel gears 41 and 43, it being noted that movement of the clutch member 45 to released position, under the control of a yoke 48 and lever 49, the latter of which has a latch mechanism 50 in engagement with a notched quadrant 51, serves to manually disrupt operative connection to the head 32, although the shaft 40 continues to rotate by virtue of its connection through the gears 41 and 43, the latter of which is directly connected to the sleeve 42.

As seen in Fig. 1, the shaft 40 is provided adjacent its lower end, and below the rectangular portion of the frame 25, with vertically spaced bevel gears 52 and 53, the former of which is in mesh with a bevel gear 54 at the rear end of a worm shaft 55. The lower gear 53 of the shaft 40 is in mesh with a similar gear 56 at the rear end of a line shaft, the latter being in forward and rear portions 57 and 58, respectively, connected by a slip joint including a squared socket 59 at the forward end of the rear portion 58 and a squared rear end 60 of the forward portion 57 interfitting the socket.

The directing body form 31, before-mentioned, which is disposed between the power head 32 and the turret 30 and which has a generally solid body, as seen in Figs. 1 and 3 in particular, is of conical shape with its smaller end foremost adjacent the turret so as to provide for the formation of bevel gears, its form being cylindrical, as seen at 61 in Fig. 14, in connection with the cutting of spur gears.

Irrespective of its particular shape, the directing body form 31, as above stated, is solid and may be either cast as a part of the rectangular frame 25 or cast in a separate piece and rigidly attached thereto. The body form 31 is provided with a plurality of equi-distantly spaced radial slots extending outwardly therein from its inner periphery, as seen at 62 in Fig. 3 in particular, these radial slots equaling in number the spaces between the teeth of the gear to be cut and each receiving the radially shiftable box 63 of its respective cutter slide 64, the latter preferably of the irregular shape shown which slidably interfits the similarly shaped longitudinal bore of its box 63 in order to provide a long bearing face which will prevent quivering or other undesirable movement of the cutters.

Figure 4:
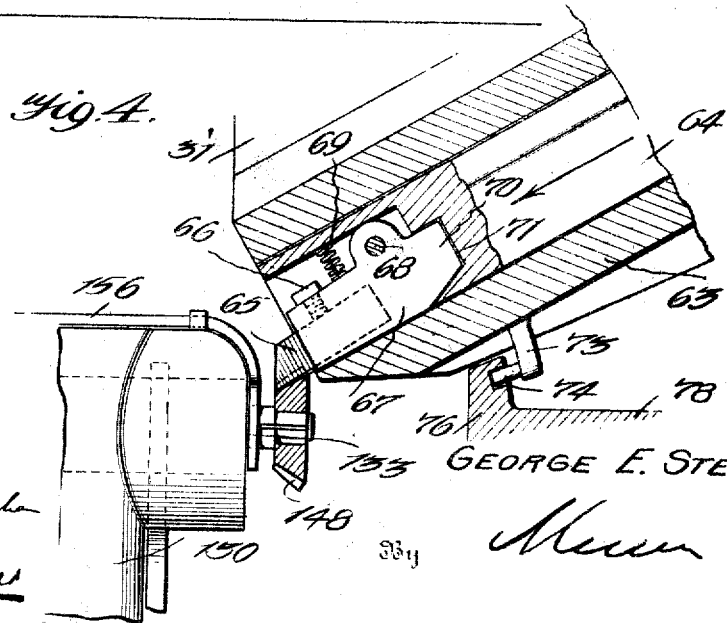
Fig. 4 is an enlarged view, partly in section, of a portion of the turret arbor and the directing body form, to illustrate in particular one of the cutters.

Each of the cutters 65, one of which is shown in Fig. 4, is adjustably held by a set screw 66 in connection with a holder 67 pivoted at 68 within the lower forward end of its respective slide 64, the holder being controlled by a spring 69 whereby the cutters may be readily removed for sharpening, repair or substitution, the inner end of each of the holders 67 having an extension 70 interfitting a conformable extension 71 of the bore of the slide receiving the same.

The rear ends of the several slides 64 are connected by pitmen or connecting arms 72 with the forward portion of the power head 32 so as to thus provide for simultaneous reciprocating movement of the series of cutter slides with their cutters, in guided relation within the bores of their boxes 63, the latter of which have radially and inwardly projecting arms 73 provided with angularly projecting pins 74 extending forwardly at their inner ends within the eccentric grooves 75 of cams 76 disposed within the conical bore 77 of the directing body form 31, in the relation thereto as particularly seen by reference to Figs. 1 and 3, these cams 76 being secured upon or formed in connection with a cam shaft 78 projecting longitudinally of the machine and axially of the directing body form 31.

Rearwardly of the directing body form 31, the cam shaft 78 is journaled in the bearing 80 of a stationary support 81 extending vertically within the power head 32, the rear extremity of the said shaft 78 having a crank disk 82 the pin 83 of which engages the upper cam groove 84 of a vertical cam cylinder 85, the upper end of the shaft 86 of which is journaled in an upper rear arm 87 of the support 81, and the lower end of which extends below the base of the frame 25 and is provided with an enlarged horizontally disposed cam disk 88 and a worm wheel 89, the latter engaged by the worm 90 at the forward end of the worm shaft 55, before described.

Thus during the operation of the machine and during reciprocating movements of the cutter carrying slides 64, movement of which is caused by the power head 32 before described, the rotation of the cam members 76 will shift the boxings 63 with the slides 64 radially of the directing body form 31 and in the slots 62 thereof, whereby the teeth of the gear wheel being cut will be properly shaped as hereinafter described.

In Fig. 14 the parts coresponding to those previously described in connection with Figs. 1 and 3 operate in the same manner, the slide 64ª being seen within its box 63ª, the latter having inwardly projecting arms 73ª connecting the same with the cams 76ª of the cam shaft 78ª, and in Fig. 15 illustrating a further modification wherein the inclination of each of the slides 64ᵇ is so great as to preclude the use of a single connecting pitman as at 72 previously described, the connection is made with the power head 32ª by means of bell crank levers, one of which is seen at 91 fulcrumed upon a support 92, each of the arms of which has an end slot 93 in order that the connections with the power head and the rear end of the respective slides 64ª may be made by pins 94 extending through these slots. In Fig. 15 mentioned the box of the slide 64ᵇ appears at 63ᵇ, its inwardly projecting arm at 73ᵇ and its controlling cam at 76ᵇ, the latter located upon its shaft 78ᵇ.

The turret 30 has an upright body provided with a vertical bore 95 extending entirely through the same and connecting with the inner ends of radially extending horizontally disposed bores 96, in each of the latter of which is disposed an arbor 97. The vertical bore 95 receives a stationary upright post 98 projecting vertically from the sliding platform 29 of the turret as particularly seen in Fig. 2, and the turret is held thereon in rotatable relation by a nut 99 threaded upon the upper portion of the post within the enlarged upper portion of the bore 95, in which the post has an upper extension 100 forming a support for an upright stem 101 supporting a stationary gear segment 102 and a cam 103.

The lower portion of the turret has an annular series of rollers 104 engaging the upper surface of the platform 29 so as to reduce friction in the rotation of the turret around the post 98, to effect which rotation the lower portion of the turret has an annular gear 105 engaged by a spur gear 106 loosely disposed upon the upper end of a vertical shaft 107 in connection with a clutch member 108. The shaft 107 supports a splined clutch member 109 for engagement with the clutch member 108 and the lower extremity of the shaft has a worm wheel 110 engaged by the worm 111, as seen in Fig. 8, of the forward portion 57 of the line shaft. The shaft 107 is journaled in the bearing arm 112 of an angular bracket 113 secured to the under side of the platform 29 by bolts or other fastening members 114 as seen in Fig. 12, and this splined clutch member 109 is controlled automatically by a spring controlled bell crank lever 115, shown in Figs. 8 and 9, engaged by the inner end of a laterally projecting push rod 116, the outer end of which normally projects slightly beyond one side of the platform 29 with the clutch in released position. For this purpose the outer end of the push rod 116 extends into a longitudinal recess 117 in the adjacent face of one of the forward side portions 27 of the main frame, as seen particularly in Fig. 9, with the parts in the operative position shown in Fig. 1 for the cutting of a gear.

The platform 29 is, however, connected by a pitman 118, shown in Figs. 1 and 2, to one end of a bell crank lever 119, seen in Fig. 10, fulcrumed at 120 upon the under side of the main frame, and the opposite end 121 of which has a roller disposed in the cam groove 122 of the horizontal cam disk 88, before described, so as to periodically shift the platform 20 forwardly to inoperative position and rearwardly to operative position, between which movements the turret is rotated by virtue of engagement of the clutch members 108 and 109 through inward movement of the push rod 116, as the latter is shifted forwardly beyond the recess 117 of the frame.

At points vertically alined with the arbors 97 the turret 30 is furthermore provided with tapering locking extensions 123 which in the rearmost operative positions of the turret enter a conformable recess 124 of the forward portion of the frame 25, as seen in Fig. 11, so as to prevent accidental shifting movements of the turret during the gear cutting operation, for which purpose each of the locking projections 123 is further provided with a transverse opening 125 adjacent its extremity for the reception of a sliding spring actuated locking plug 126 mounted in the frame, as seen in Fig. 11, its spring being at 127. This plug has a pin 128 engaged by the forward bifurcated end of a controlling arm 129, as seen in Figs. 2 and 11, the rear end of which, as seen in Figs. 1 and 10, is pivoted at 130 to the under side of the frame 25 and has an angular extremity 131 provided with a roller for engagement with a projection 132 of the cam disk 88 at a point slightly in advance of forward shifting movement of the turret platform 29, which projection thus serves not only to withdraw the locking plug 126 but to hold the latter in retracted inoperative position during the reciprocating movement of the platform 29 and consequently during rotation of the turret, the plug being released when the turret has again returned in shifted position so that the spring 127 will force the plug 126 into operative engagement with the respective extension 123 once again.

Each of the arbors 97 of the turret 30, as best seen by reference to Figs. 2 and 5, is provided with a longitudinal bore extending entirely therethrough and through the reduced cylindrical extension 133 at its outer end, which extension forms a seat for the gear blank and is, for this purpose, split, as seen at 134 in Figs. 6 and 7, so that by means of an internal wedge member 135 the split portions of the gear seat may be expanded to rigidly clamp the gear blank internally of the latter. This wedge member 135 has an inwardly projecting threaded stem 136 extending into the bore of the arbor and engaged by the adjacent internally threaded end of a shaft 137 extending through the bore of the arbor, the inner end of which is threaded at 138, as seen particularly in Fig. 2, and is engaged by an internally threaded bevel gear 139, the latter of which is in turn engaged by upper and lower bevel gears 140 and 141 which hold the gear 139 against the inner end of the arbor 97 and prevent the same from longitudinal movement so that upon its rotation the shaft 137 will be moved longitudinally so as to shift the wedge member 135 into and out of operative position, depending upon the direction of such movement.

The gear 140, one of which is provided adjacent the inner end of each of the arbors, is mounted upon the lower end of a vertically projecting shaft 142 having a spur gear 143 adjacent said bevel gear and having a hand wheel 144 at its upper end, while the gear 141, of which there is only one to the entire turret, is mounted upon the upper end of a vertical shaft 145 journaled through the upright post 98 and the lower end of which has a bevel gear 146 below the main frame in engagement with a similar bevel gear 147 upon the forward portion 57 of the line shaft, the shaft 145 being positioned so that its gear 141 engages each arbor gear 139 in the inoperative position of the latter with respect to the gear cutting operation.

Thus with the parts in the position shown in Fig. 2 the arbor 97 at the right is in position for the cutting of the bevel gear 148 shown seated thereon, and during the cutting of which a gear blank is placed upon the seat previously described at the outer end of the left hand arbor 97. When the blank is seated the operator depresses a foot piece 149, shown at the left in Fig. 2, located at the upper end of a rod 150 normally held in upper position by a spring 151 and the lower end of which is connected by a bell crank lever 152, as plainly seen in Fig. 12, to the cone-shaped male member 153 of a clutch, the female member 154 of which is loosely disposed upon the forward portion 57 of the line shaft although in rigid connection with the bevel gear 147 just previously described. Furthermore, the foot piece 149 has an adjusting screw 155 which limits its downward movement so that the movement of member 153 of the clutch into the member 154 is correspondingly limited whereby rotation is communicated from the line shaft to the vertical shaft 145 at such power as to shift the shaft 137 longitudinally to effectively clamp and lock the gear blank upon its seat, without danger of stripping the gears should the operator neglect to release the foot piece 149 at the proper instant. This arrangement provides for relative slipping movement of the clutch members 153 and 154 when the gear blank is effectively clamped.

Referring now to Fig. 5 it will be noted that the gear segment 102, before described, is so disposed as to engage the spur gear 143 of each of the vertical shafts 142 upon rotation of the turret, as the latter moves forwardly upon the completion of each gear cutting operation, so that the respective shaft 142 will be rotated and through its gear 140 rotate the respective gear 139 so as to shift the respective arbor shaft 137 outwardly, thus releasing the previously completed clamping engagement of the cut gear so that when the turret has been rotated through a half turn with the parts as shown, the cut gear will be released from its seat and the gear blank presented in operative position for the tooth cutting operation.

Immediately following the release of each of the cut gears, the gear is discharged from its seat through the action of its respective discharge arm 156, these arms extending over the top of the turret, as best seen in Figs. 2 and 6, with their outer forked ends 157 at opposite sides of the gear seat, as seen in Fig. 8, and with their inner forked ends 158 disposed at spaced points with respect to the axis of the turret and adjacent the upper cam 103 of the stationary stem 101 so as to be engaged thereby during the rotation of the turret subsequent to the engagement of the gear segment 102 with the respective spur gear 143. Each of the discharge arms 156 works through bearings 159 of the turret and is normally controlled and held in innermost position by a spring 160, against the tension of which the arm is shifted by the cam 103 so as to move its outer forked end 157 outwardly against the released gear 148 to shift the latter off its seat.

Adjacent its outer end each of the arbors 97 has a depending gear segment 161 shiftable laterally in a slot in the turret so as to oscillate the arbor during the gear cutting operation in bringing about proper shaping of the teeth of the gear being cut, each of the segment gears 161 having an intermediate opening 162 by means of which it is locked against movement except when the respective turret arbor is in operative position, and said segment gear 161 is engaged in such operative position by a similar segment gear 163 secured to and projecting above the forward end of a shaft 164, journaled in the main frame 25, and provided at its rear end with a crank disk 165 and pin 166, the latter of which enters the lower groove 167 of the upright cam cylinder 85, before described. It being understood that the segment gears 161 and 163 are in engagement only when the turret is in operative position ready for the tooth cutting operation, it follows that the gear 161 must be locked to prevent the slightest accidental shifting and provide for its accurate movement with the turret into engagement with the segment gear 163. For this purpose the turret has adjacent each of its segment gears 161 a horizontally shiftable locking rod 168 the outer end of which is movable into the opening 162 of the gear segment under the tension of a spring 169, the rod having intermediate pins 170 engaged by the upper slotted end of a bell crank lever 171 fulcrumed in the turret at 172 with its opposite end projecting exteriorly thereof for engagement by a stationary angular arm 173 carried by the frame adjacent the gear cutting station. Thus as the turret is moved forwardly, rotated through a half circle and again shifted rearwardly to bring a new blank into position at the gear cutting station, the respective lever 171 engages the arm 173 as the respective turret extension 123 is secured and locked in the cut out portion of the frame, so as to shift the rod 168 inwardly and free the respective gear segment 161 which is at this time in engagement with the gear segment 163 of the shaft 164.

In operation, the arbor supporting the gear being cut is thus oscillated during the simultaneous cutting of the several teeth of the gear so that the inner faces of the several teeth of the gear will be properly curved and shaped as desired and as seen by a comparison of the several stages of the operation as seen in Fig. 16. In the first and last positions of this figure the cutter is seen in its retracted inactive position during the reciprocation and rotation of the turret. The second position shows the cutter in innermost position after its full depth of cut with the blank stationary, after which the cutter is withdrawn from the blank as seen in the third position, with the blank shifted. The fourth position shows the cutter again in innermost position during which inward movement the blank is shifted to form one side of one tooth, after which the cutter is withdrawn to the fifth position and the blank again shifted. The sixth position shows the cutter again in innermost position during the movement of which the blank is shifted to form the adjacent side of the next tooth.

Furthermore referring to Fig. 16, it will thus be apparent that during reciprocation of the cutters between positions 1 and 2, the blank is stationary, and, as the cutters are drawn inwardly, the true radial cuts are made. The cutters then withdraw and the blank is partially rotated to the 3rd position, and is continuously moved in a rotary direction as the cutter is again moved inwardly during reciprocation so that the cutter gradually enters the groove previously formed, to the 4th position, whereby to shape the teeth at one side. Between the 4th and 5th positions, the cutters are withdrawn, just as they were between the 2nd and 3rd positions, and the blank is partially rotated in a reverse direction to the 5th position, and then continuously moved in a rotary direction between the 5th and 6th positions and during inward movement of the reciprocating cutters, so as to shape the opposite sides of the teeth, the cutter gradually entering the original groove during its last stage as it did between operations 3 and 4 except in a reverse direction.

It is to be understood, of course, that the cutters are moved back and forth during each tooth cutting operation so that in following through the desired sequence of operations the series of teeth of the gear being cut will be completed between the periods of movement of turret.

By referring to Fig. 17 it will be noted that the cam cylinder 85 has a lug 174, seen also in Fig. 1, for engagement with the inner free end of a lever 175, which latter is fulcrumed upon the bracket 176 extending forwardly from the rear side portion of the frame 25 adjacent and in front of clutch member 45 of Fig. 13. The opposite end of the lever 175 has a movable pivotal connection at 176ª with the forward end of a push rod 177 normally held in forward position by a spring 178, the rear end of said push rod projecting through an opening in one rear side portion of the frame 25 forwardly of said clutch member 45 of Fig. 13, for engagement in the slot 45ª of the enlargement of the clutch member 45.

Thus, the lever 175 will be shifted by the cam cylinder 85 to thrust the rear end of the push rod 177 into the slot 45ª at the completion of each cutting operation to force withdrawal of the clutch member 45 to released position against the tension of spring 46. The clutch member will be held in such released position during the reciprocating and rotative movements of the turret to bring a new blank into operating position, at which time the lug 174 will have completely passed the lever 175, and upon release of the latter the spring 178 will return the push rod 177 to the position shown in Fig. 17, so as to release the clutch member 45 which will once more engage the clutch sleeve 42 and complete driving connection to the reciprocating head 32, in order to start the operations of the cutters.

It is obvious when one of the arbors of the turret is in position to present the gear blank carried thereby at the tooth cutting station, the opposite arbor may be supplied with a blank, which is clamped thereon by the means previously described, either by pressure upon the foot piece 149 or by rotation of the hand wheel 144. When the tooth cutting operation is completed the turret is automatically shifted with its platform 29 and during such shifting movement is rotated through a half turn on the platform and then returned with the latter to operative position where it is locked with the previously supplied and clamped blank in position for the tooth cutting operation.

It is to be borne in mind, however, that a great many of the details of construction as herein shown and described for the purpose of bringing about the operation set forth may be varied, modified, and some dispensed with, without departing from the spirit and the terms of the appended claims.

I claim:

1. In a gear cutting machine, the combination of a blank supporting mechanism, a plurality of cutters for simultaneously acting upon the blank to form a plurality of grooves between a plurality of gear teeth, and mechanism for simultaneously feeding the several cutters and shifting the same with respect to the blank during the cutting operation.

2. In a gear cutting machine, the combination with a blank supporting mechanism, a plurality of cutters for simultaneously cutting a plurality of grooves between a plurality of gear teeth, mechanism for simultaneously feeding the several cutters, and mechanism for shifting the several cutters with respect to the blank during the cutting operation.

3. In a gear cutting mechanism, the combination of means for supporting a gear blank, a plurality of reciprocating cutters for simultaneously cutting a plurality of grooves between a plurality of teeth upon the blank, means having connection with the several cutters for feeding the same, and other means having connection with the several cutters for shifting the same with respect to the blank during the cutting operation.

4. In a gear cutting machine, the combination of a blank supporting mechanism, a plurality of cutters for simultaneously cutting a plurality of grooves between a plurality of teeth on the blank, mechanism for simultaneously feeding the said cutters, and means whereby to shift the blank on its axis during the tooth cutting operation.

5. In a gear cutting machine, the combination of a blank supporting mechanism, an annular series of reciprocating cutters for simultaneously cutting teeth on the blank, means having connection with the several cutters for actuating the same, and means for automatically shifting the several cutters toward and away from their common center during such actuation.

6. In a gear cutting machine, the combination of a blank supporting mechanism, an annular series of cutters for simultaneously cutting the gear teeth of the blank, and a reciprocating power head having connection with each of said cutters whereby to simultaneously actuate the latter.

7. In a gear cutting machine, the combination of a frame, an annular series of cutters mounted to reciprocate in the frame, blank supporting means carried by the frame, adjacent the said cutters, and a power head mounted to reciprocate in the frame and having connection with each of said cutters to simultaneously actuate the latter.

8. In a gear cutting machine, the combination of a frame, means to support a gear blank to be cut, a plurality of cutters reciprocating in the frame for simultaneous action upon the gear blank to form a plurality of grooves between a plurality of teeth around the blank, a power head mounted to reciprocate in the frame, and connected to the several cutters, a driven shaft journaled in the frame, a crank carried by the said shaft, and a pitman connecting the crank with the power head for the purpose described.

9. In a gear cutting machine, the combination of a blank supporting means, a plurality of reciprocating cutters for simultaneous action upon the blank to form a plurality of grooves between a plurality of teeth around the blank, and means to simultaneously actuate the cutters, each of said cutters having guided movements parallel with and at angles to its longitudinal axis.

10. In a gear cutting machine, the combination of a blank supporting means, a plurality of reciprocating cutters for simultaneous action upon the blank, means to simultaneously actuate the cutters, said cutters being arranged in an annular series, and a guide form in which the several cutters reciprocate and are movable toward and away from their common axis.

11. In a gear cutting machine, the combination of means to support a gear blank, a plurality of cutters, and means to simultaneously actuate the cutters, said cutters being arranged in an annular series, a directing body form having a stationary support and provided with an annular series of radial slots in each of which slots one of said cutters is mounted to reciprocate, and to move toward and away from the said directing body form.

12. In a gear cutting machine, the combination of means to support a gear blank, a frame, a directing body form rigidly supported by the frame adjacent and coaxial with the blank supporting means and having an axial bore, and a plurality of slots radiating from the said bore, a plurality of reciprocating cutters mounted in the said slots, means for simultaneously moving the said cutters, and automatically actuated means disposed in the bore of the body form, and having operative connections with the said cutters for shifting the latter in the slots toward and away from the axis of the body form.

13. In a gear cutting machine, the combination of means to support a gear blank, a frame, a directing body form rigidly supported by the frame adjacent the blank supporting means and having an axial bore and a plurality of slots radiating from the said bore, a plurality of reciprocating cutters mounted in the said slots, means for simultaneously moving the said cutters, automatically actuated means disposed in the bore of the body form and having operative connections with the said cutters for shifting the latter in the slots toward and away from the axis of the body form, said means consisting of cams, a shaft upon which the cams are mounted having a crank pin, and a cylinder having a cam groove in which the crank pin is disposed, whereby the cams may be rotated to simultaneously shift several cutters.

14. In a gear cutting machine, the combination of means to support a gear blank, a frame, a directing body form rigid with the frame and adjacent the gear blank, said body form having an axial bore, and a plurality of slots radiating from said bore, longitudinally bored cutter boxes disposed in each of the slots and shiftable therein toward and away from the axis of the body form, a cutter shiftable longitudinally in the bore of each of the said boxes, means connected to the cutters for simultaneously reciprocating the same, and means connected to the several boxes for simultaneously shifting the latter.

15. In a gear cutting machine, the combination of means to support a gear blank, a frame, a directing body form rigid with the frame and adjacent the gear blank, said body form having an axial bore, and a plurality of slots radiating from said bore, longitudinally bored cutter boxes disposed in each of the slots and shiftable therein toward and away from the axis of the body form, a cutter shiftable longitudinally in the bore of each of the said boxes, means connected to the cutters for simultaneously reciprocating the same, each of said boxes having radially and inwardly projecting arms extending into the bore of the directing body form, and means disposed in the said bore of the body form and engaging the several arms of the boxes for shifting the latter.

16. In a gear cutting machine, the combination of means to support a gear blank, a frame, a directing body form rigid with the frame and adjacent the gear blank, said body form having an axial bore, and a plurality of slots radiating from said bore, longitudinally bored cutter boxes disposed in each of the slots and shiftable therein toward and away from the axis of the body form, a cutter shiftable longitudinally in the bore of each of the said boxes, means, connected to the cutters for simultaneously reciprocating the same, arms extending inwardly from each of said cutter boxes and within the bore of the body form, a shaft extending axially of the body form, cams carried by the shaft and operatively engaging the arms of the said boxes, and means for imparting oscillatory movements to the said shaft.

17. In a gear cutting machine, the combination of means to support a gear blank, a frame, a directing body form rigid with the frame and adjacent the gear blank, said body form having an axial bore, and a plurality of slots radiating from said bore, longitudinally bored cutter boxes disposed one in each of the slots and shiftable therein toward and away from the axis of the body form, a cutter shiftable longitudinally in the bore of each of the said boxes, means connected to the cutters for simultaneously reciprocating the same, arms extending inwardly from each of said cutter boxes and within the bore of the body form, a shaft extending axially of the body form, cams carried by the shaft and operatively engaging the arms of the said box, means for imparting oscillatory movements to the said shaft, said means including crank carried by the shaft, and a cylinder provided with a cam groove in which the crank of the said shaft is engaged.

18. In a gear cutting machine, the combination of a plurality of cutters, and means for simultaneously actuating the said cutters, means for holding a gear blank in position for action by said plurality of cutters consisting of a turret having an arbor in which the gear blank is disposed and held, and means for oscillating the said arbor with its gear blank during and in synchronism with the operation of the cutters.

19. In a gear cutting machine, the combination of a plurality of cutters, and means for simultaneously actuating the said cutters, means for holding a gear blank in position for action by said cutters consisting of a turret having an arbor on which the gear blank is disposed and held, a gear member carried by the arbor, a cam shaft, and a gear member carried by the cam shaft and engaging the gear member of the arbor for the purpose described.

20. In a gear cutting machine a plurality of simultaneously operating cutters, a turret having blank supporting arbors, and rotatively mounted to successively bring its arbors into operative position adjacent to the cutters, means for shifting the turret bodily into and out of operative position, means for rotating the same during its shifting movement, and means for locking the same against both rotative and bodily shifting movement when in operative position.

21. In a gear cutting machine, the combination with a cutting mechanism, including a frame, of a blank supporting mechanism including a platform having movement longitudinally of the frame, a turret rotatable on the platform, cam controlled means for shifting the said platform with its turret, means for automatically rotating the turret during its shifting movement with the platform, and horizontally disposed arbors carried by the said turret, each of which is provided at its outer end with means forming a seat for a gear blank and a plurality of cutters acting simultaneously upon a blank on the said seat to simultaneously form a plurality of uniformly spaced teeth around the blank.

22. In a gear cutting machine, a frame having forward guides, a platform shiftable in the said guides, a turret carried by and rotatable on the platform, arbors carried by and rotatable in the turret, connections for rotating the arbors, including gear members movable into and out of engagement with one another upon shifting movement of the turret with its platform, and means for rotating the turret during its shifting movement with the platform.

23. In a gear cutting machine, a frame having forward guides, a platform shiftable in the said guides, a turret carried by and rotatable on the platform, arbors carried by and rotatable in the turret, connections for rotating the arbors including gear members movable into and out of engagement with one another upon shifting movement of the turret with its platform, certain of which gears are secured to the arbors, and means for locking the arbor carried gears against movement during rotation of the turret and its movement with the platform.

24. In a gear cutting machine the combination of a cutting mechanism, a frame in which the cutting mechanism is mounted, a turret having blank supporting arbors and having rotatable and longitudinally shifting movements with respect to the frame, said turret having projections adjacent its arbors, and said frame having a recess to receive the said projections in the operative position of the turret to prevent displacement of the latter during the cutting operation.

25. In a gear cutting machine the combination of a cutting mechanism, a frame in which the cutting mechanism is mounted, a turret having blank supporting arbors and having rotatable and longitudinally shifting movements with respect to the frame, said turret having projections adjacent its arbors provided with openings, said frame having a recess to receive the said projections in the operative position of the turret, and means for locking each projection in operative position within the recess of the frame.

26. In a gear cutting machine, a turret having arbors for supporting the gear blanks, each of which arbors is provided on its outer end with a slotted extension forming a blank seat, and also has a longitudinal bore, means extending through the bore of the arbor for securing the blank upon the said seat, means for automatically releasing the blank, and means for shifting the blank off of the seat when released.

27. In a gear cutting machine, a rotating turret having blank supporting arbors provided with seats at their outer ends for the reception of the gear blanks, means in connection with said blank seats for clamping the blanks thereon, means automatically acting during rotation of the turret for releasing the blank clamping means, and means also acting automatically during rotation of the turret for shifting the released blanks off of the seats.

28. In a gear cutting machine, a turret having blank supporting means, means for reciprocating the turret bodily into and out of operative position, means for rotating the turret during its reciprocating movement, cutters for operating upon the blank when the turret is in operative position, and means to hold the cutters in inactive position during the rotation and reciprocation of the said turret.

29. In a gear cutting machine, a turret having blank supporting means and mounted to rotate and reciprocate, a plurality of cutters for action upon the blank when the turret is in operative position, driving connections for the cutters including a movable clutch, means for shifting the turret bodily into and out of operative position, means for rotating the turret during its shifting movement, and means for releasing the clutch of the cutters to render the latter inactive during the rotative and reciprocating movements of the turret.

GEORGE EMETT STEVENSON.

Witnesses:
GEORGE R. STEVENSON,
ROBERT L. HICKSON.